(12) United States Patent
Neblett et al.

(10) Patent No.: US 6,371,768 B1
(45) Date of Patent: Apr. 16, 2002

(54) UNIVERSAL CHARGE PORT CONNECTOR FOR ELECTRIC VEHICLES

(75) Inventors: Larry L. Neblett, Pinckney; David A. Lescamela, Clinton Township; Thomas E. Zielinski, China, all of MI (US); Guenter Rohr, Schwindegg (DE)

(73) Assignees: DaimlerChrysler Corporation, Auburn Hills, MI (US); Otto Dunkel GmbH, Muhldorf (DE)

( * ) Notice: Subject to any disclaimer, the term of this patent is extended or adjusted under 35 U.S.C. 154(b) by 0 days.

(21) Appl. No.: 09/282,529

(22) Filed: Mar. 31, 1999

Related U.S. Application Data

(60) Provisional application No. 60/080,071, filed on Mar. 31, 1998.

(51) Int. Cl.[7] .............................................. H01R 33/00
(52) U.S. Cl. ................................................... 439/34
(58) Field of Search ............................ 439/34, 911, 320

(56) References Cited

U.S. PATENT DOCUMENTS

| | | | |
|---|---|---|---|
| 3,711,816 A | | 1/1973 | Schumacher |
| 3,888,559 A | | 6/1975 | Geib |
| 3,944,316 A | | 3/1976 | Newman et al. |
| 3,950,059 A | | 4/1976 | Anhalt et al. |
| 5,131,858 A | | 7/1992 | Heimbrock |
| 5,157,319 A | * | 10/1992 | Klontz et al. ................... 320/2 |
| 5,220,268 A | * | 6/1993 | Rose et al. ..................... 320/2 |
| 5,222,909 A | | 6/1993 | Nomura et al. |
| 5,252,088 A | | 10/1993 | Morello et al. |
| 5,324,208 A | | 6/1994 | Kodama et al. |
| 5,350,312 A | | 9/1994 | Kuno et al. |
| 5,401,174 A | * | 3/1995 | Hansen ........................ 439/34 |
| 5,417,579 A | | 5/1995 | Yoshioka et al. |
| 5,429,524 A | | 7/1995 | Wakata et al. |
| 5,433,623 A | | 7/1995 | Wakata et al. |
| 5,435,743 A | | 7/1995 | Farah |
| 5,458,496 A | | 10/1995 | Itou et al. |
| 5,498,948 A | * | 3/1996 | Bruni et al. ................... 320/2 |
| 5,511,987 A | | 4/1996 | Shinchi |
| 5,536,173 A | | 7/1996 | Fujitani et al. |
| 5,545,049 A | | 8/1996 | Hasegawa et al. |
| 5,556,284 A | | 9/1996 | Itou et al. |
| 5,558,533 A | | 9/1996 | Hashizawa et al. |
| 5,573,417 A | | 11/1996 | Hashizawa et al. |
| 5,575,674 A | | 11/1996 | Endo et al. |
| 5,577,920 A | | 11/1996 | Itou et al. |
| 5,611,703 A | | 3/1997 | Okamoto et al. |
| 5,614,808 A | | 3/1997 | Konoya et al. |
| 5,622,512 A | | 4/1997 | Uchida et al. |
| 5,627,448 A | | 5/1997 | Okada et al. |
| 5,730,625 A | | 3/1998 | Sikora |
| 5,820,409 A | | 10/1998 | Clark et al. |
| 5,823,808 A | | 10/1998 | Clarkk et al. |
| 5,864,106 A | | 1/1999 | Hartwig |

FOREIGN PATENT DOCUMENTS

DE        196 49 707 C2    2/1999

* cited by examiner

*Primary Examiner*—Brian Sircus
*Assistant Examiner*—Brian S. Webb
(74) *Attorney, Agent, or Firm*—Mark P. Calcaterra

(57) ABSTRACT

An electrical connector assembly has a male and female connector. The male connector has electrical contacts in a housing for conducting AC or DC current. The female connector also includes a housing with electrical contacts to electrically couple with the male electrical contacts. The electrical contacts are coupled between a power source and a rechargeable power user, such as batteries in an electric vehicle. A mechanism to terminate power of the rechargeable power user is coupled with the system to prohibit use of the rechargeable power user during charging.

10 Claims, 10 Drawing Sheets

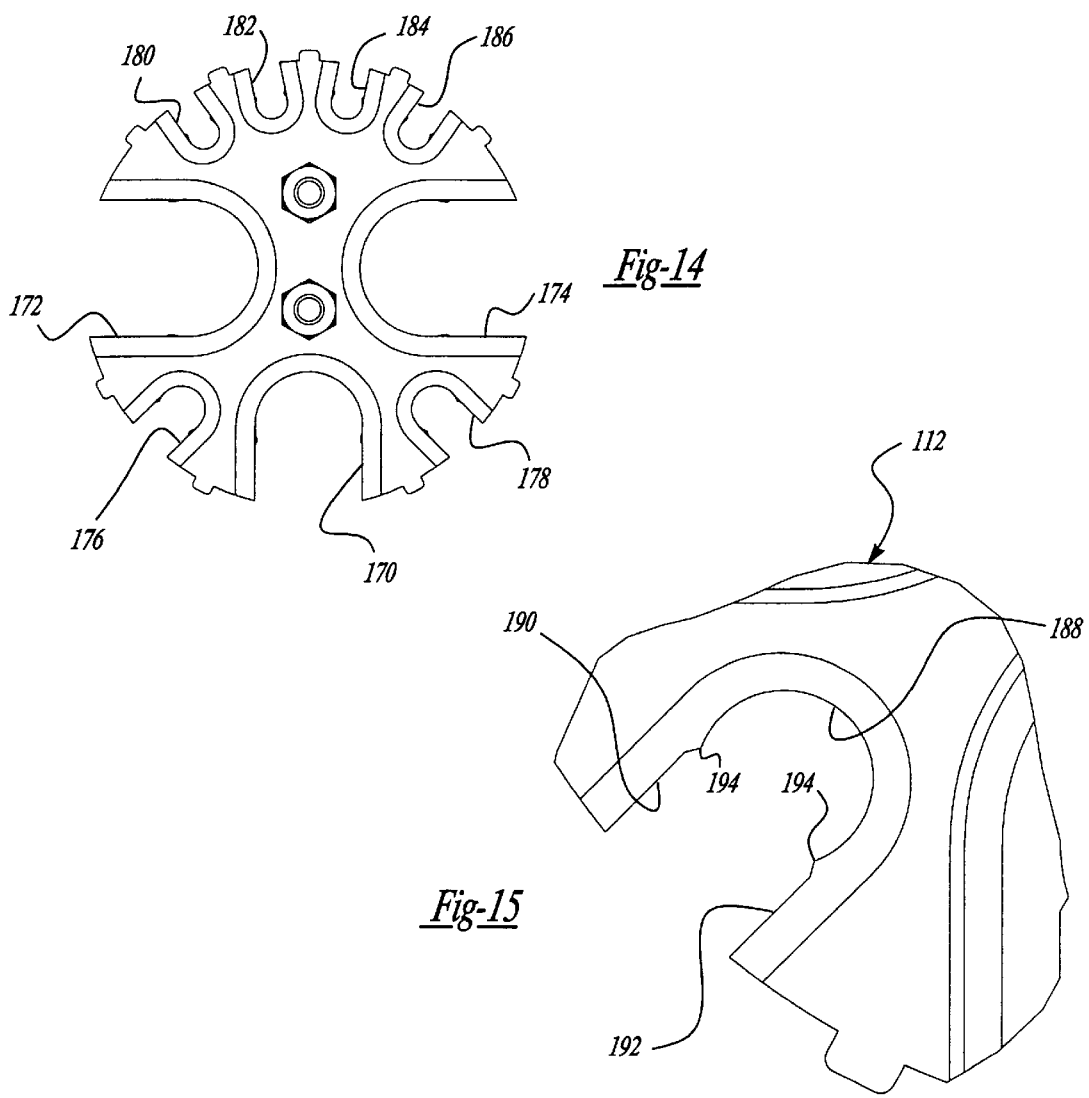
*Fig-14*
*Fig-15*
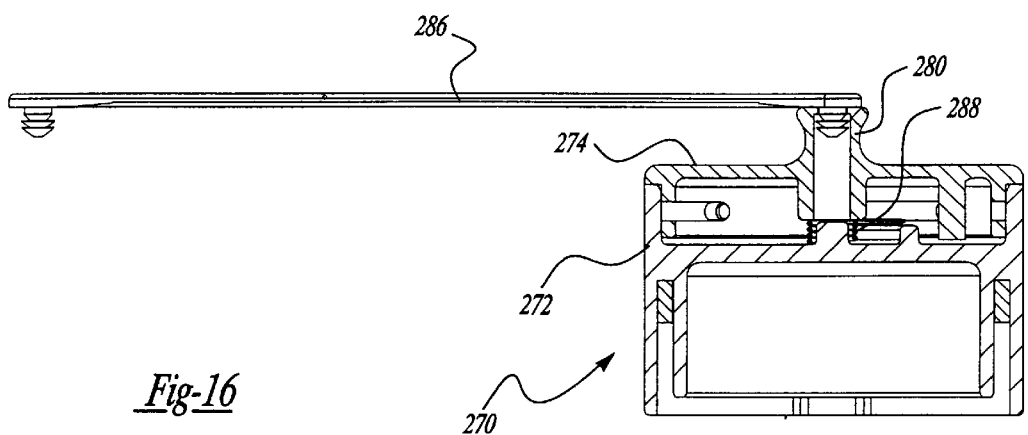
*Fig-16*

UNIVERSAL CHARGE PORT CONNECTOR FOR ELECTRIC VEHICLES

CROSS REFERENCE TO RELATED APPLICATION

This application is based upon and claims priority to U.S. Provisional Patent Application Ser. No. 60/080,071 filed Mar. 31, 1998, and entitled Universal Charge Port Connector for Electric Vehicles, the specification and drawings of which are herein expressly incorporated by reference.

BACKGROUND OF THE INVENTION

The present invention relates to electrical connectors and, more particularly, to electrical connectors utilized in electric vehicles for supplying current to recharge the vehicle batteries.

DESCRIPTION OF THE RELATED ART

With the proliferation and increase emphasis on development of electrical powered vehicles, the need for electrical connectors for transmitting high and low current to the batteries exist. Connectors used in the automotive field and elsewhere, and particularly in electrical vehicles, must be capable of withstanding heavy current loads. In electrical vehicles, connectors are used to connect the battery pack of the electric vehicle to high or low voltage distribution boxes and to connect the high or low voltage distribution boxes to the charging port and to the motor of the vehicle.

The environment in which these connectors are used places a great deal of both mechanical and thermal stress on the connectors. The mating members of these connectors must be securely connected so that the connector does not fail during normal usage. Additionally, the connectors must be relatively easy to mate, that is, one member of the connector be readily insertable into its mating member. It is also desirable for the connector to handle both AC as well as DC current so that one connector may be used for both power sources. It is also desirable that the connector house control circuits for prohibiting arcing between the positive and negative contacts within the connector. Further, the connector should prohibit unauthorized connector separation during charging of the vehicle batteries. Furthermore, the connector should prohibit the vehicle from moving during the charging of the batteries.

Additionally, unlike a typical automotive application, where the vehicle chassis provides the return path, in electric vehicles, high voltage negative contacts must be isolated from the vehicle chassis. Further, it is desirous to have both the positive and negative voltage contacts in the same connector body for space considerations.

SUMMARY OF THE INVENTION

Accordingly, it is an object of the present invention to provide a connector capable of conducting both high and low voltages from a DC or AC power source. It is also an object to have a connector which is provided with both AC and DC contacts so that, depending upon the power source, the contacts can accommodate the power source. Further, the present invention provides a mechanism which prohibits unauthorized separation of the connectors during charging of the vehicle batteries. Another object is that the present invention provides a connector which terminates power to the connector prior to separation of the male and female members to prohibit arcing. The present invention also, during charging, cuts off the power in the vehicle so that it cannot be driven away during charging. Further, the present invention provides handles on the connectors to enable easy manipulation of the connectors to couple the male and female connectors together.

Other features of the present invention are disclosed and claimed in the following co-pending patent applications which were filed the same day as the present patent application and are hereby incorporated by reference.

In a first aspect of the invention, an electrical connector assembly comprises a male connector having a housing with a first pair and second pair of electrical contacts in the housing. A female connector has a housing with a first pair of electrical contacts to electrically couple with the male connector first pair of electrical contacts. The female connector also includes a second pair of electrical contacts to electrically couple with the male connector second pair of electrical contacts. One of the pair of electrical contacts is for conducting DC current and the other of the pairs of electrical contacts is for conducting AC current.

The connector assembly includes a common ground for both pairs of electrical contacts. The male connector has an elongated housing with a first and second handle. Also, a latching mechanism is coupled with the male housing to secure the male and female housings together. Further, the male housing is capable of coupling with a plurality of members to receive a plurality of different sized power sources.

The female housing has a first member with a cup portion which defines a cavity to receive the male connector. The cup has a base with a plurality of apertures to receive the pairs of electrical contacts. A collar portion extends from the cup portion to receive electrical contacts. A second member couples with the collar member of the first member. The second member has a plurality of electrical contact holding members to receive the electrical contacts and align the electrical contacts to position the contacts into the apertures. The female housing includes a third member which is coupled with the first member. The third member has a ring member with a plurality of apertures enabling securement with the vehicle body. A door is coupled with the third member to cover the ring opening. A cap is coupled with the female housing when the male and female housings are disconnected. The cup includes a rotatable member to secure the cap with the female housing. The rotatable member is biased to return to its original position upon removal from the female housing.

In a second aspect of the invention, the electrical connector assembly comprises a male connector having a housing and electrical contacts in the housing for conducting AC or DC current. The male connector has a housing to couple with the female connector. Electrical contacts are in the female housing to couple with the electrical contacts and the male connector. A mechanism to eliminate current arcing during disconnection of the male and female connectors is coupled with at least one of the male or female connectors. The mechanism includes a switch coupled with a power source for the connector assembly. The switch terminates current flow prior to disconnection of the male and female connectors. The mechanism has a release lever coupled with the switch to activate the switch. Also, the release lever is coupled with a latch which releasably locks the male and female connectors in a coupled position.

In another aspect of the invention, an electrical connector comprises a male connector with a housing having electrical contacts in the housing to conduct AC or DC current. A female connector has a housing to couple with the male connector housing. Electrical contacts are in the female housing to couple with the electrical contacts in the male housing. The male and female connectors are coupled between a power source and a rechargeable power user. Also included is a mechanism to terminate power to the rechargeable power user prohibiting use of the rechargeable power user during charging. The rechargeable power user is an electric vehicle including electric batteries. The mechanism has a switch to cut off power in the vehicle so that the vehicle is disabled during charging. The mechanism is coupled with the connector on the rechargeable power user. The female housing has a cover to cover the electrical contacts in a disconnected position. The cover activates the mechanism upon opening of the cover to enable connection with the male connector.

In another embodiment of the invention, the electrical connector assembly comprises a male connector with a housing having electrical contacts in the housing to conduct AC or DC current. A female conductor has a housing to couple with the male housing. Electrical contacts are in the female housing to couple with the male electrical contacts. A latch mechanism releasably couples the male and female connectors together. A lock mechanism is coupled with the latch mechanism to prohibit unauthorized disconnection of the male and female connectors in a coupled position. The latch mechanism has a trigger pivoted with a catch. The trigger releases the catch which holds the male and female connectors together. The trigger and catch are housed in the male connector housing with the catch adapted to couple with the female connector housing. The housing has a trigger guard with an opening. The trigger is in the opening which enables access to the trigger. The lock mechanism includes a member to prohibit pivoting of the trigger. The lock mechanism includes an aperture in the trigger guard with the member in the aperture. The member is ordinarily a padlock.

These and other objects and advantages of the present invention will be described in greater detail in the detailed description of the preferred embodiment, the appended drawings and the attached claims.

BRIEF DESCRIPTION OF THE DRAWINGS

FIG. 14 is an elevation view of the contact holder of FIG. 8;

FIG. 15 is an enlarged view of one of the holders of FIG. 14; and

FIG. 16 is a cross-section view of the cap cover of FIG. 8.

DETAILED DESCRIPTION OF THE PREFERRED EMBODIMENTS

Figure 1:
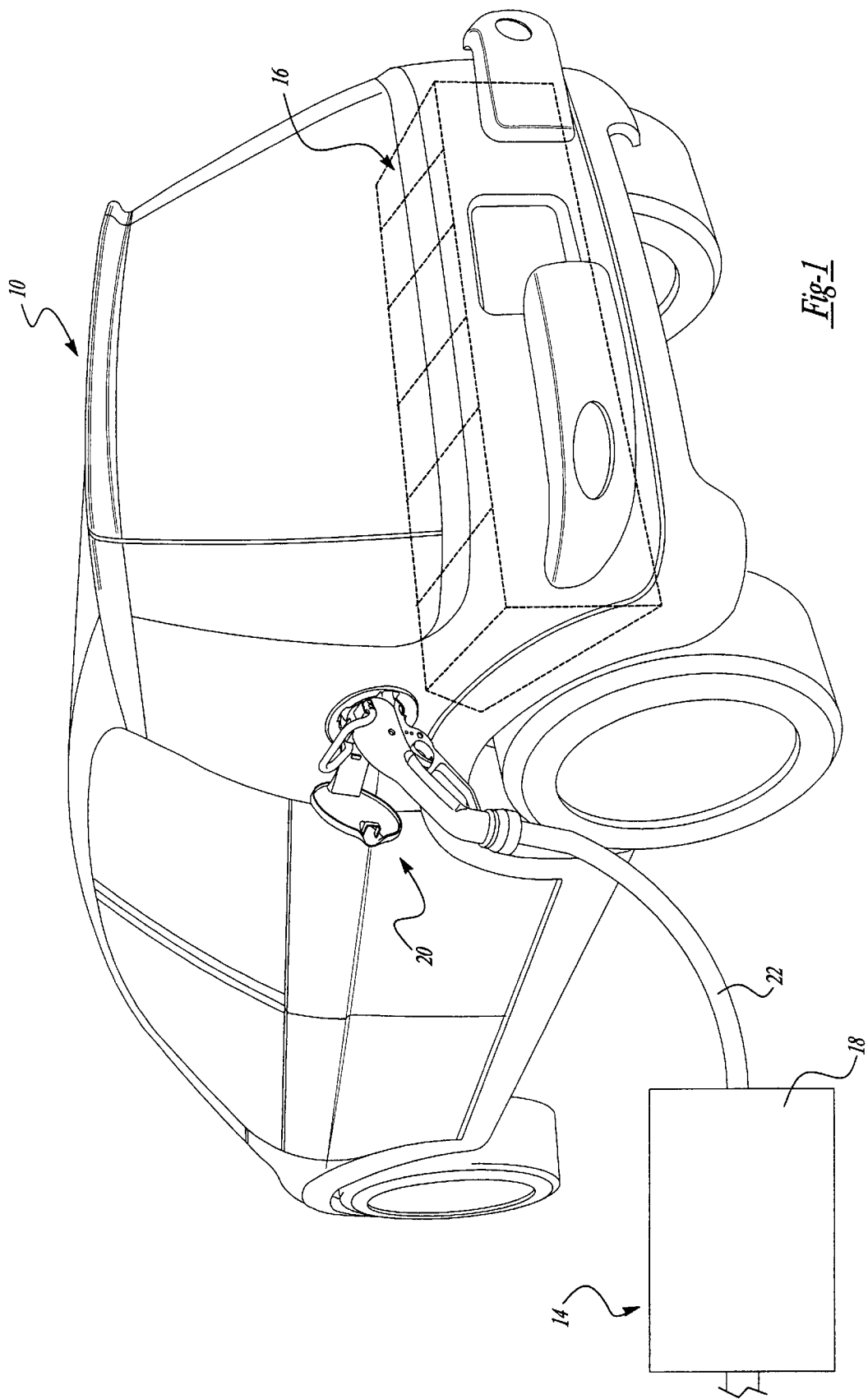
FIG. 1 is a perspective view of a connector assembly in accordance with the present invention on a vehicle.
Figure 2:
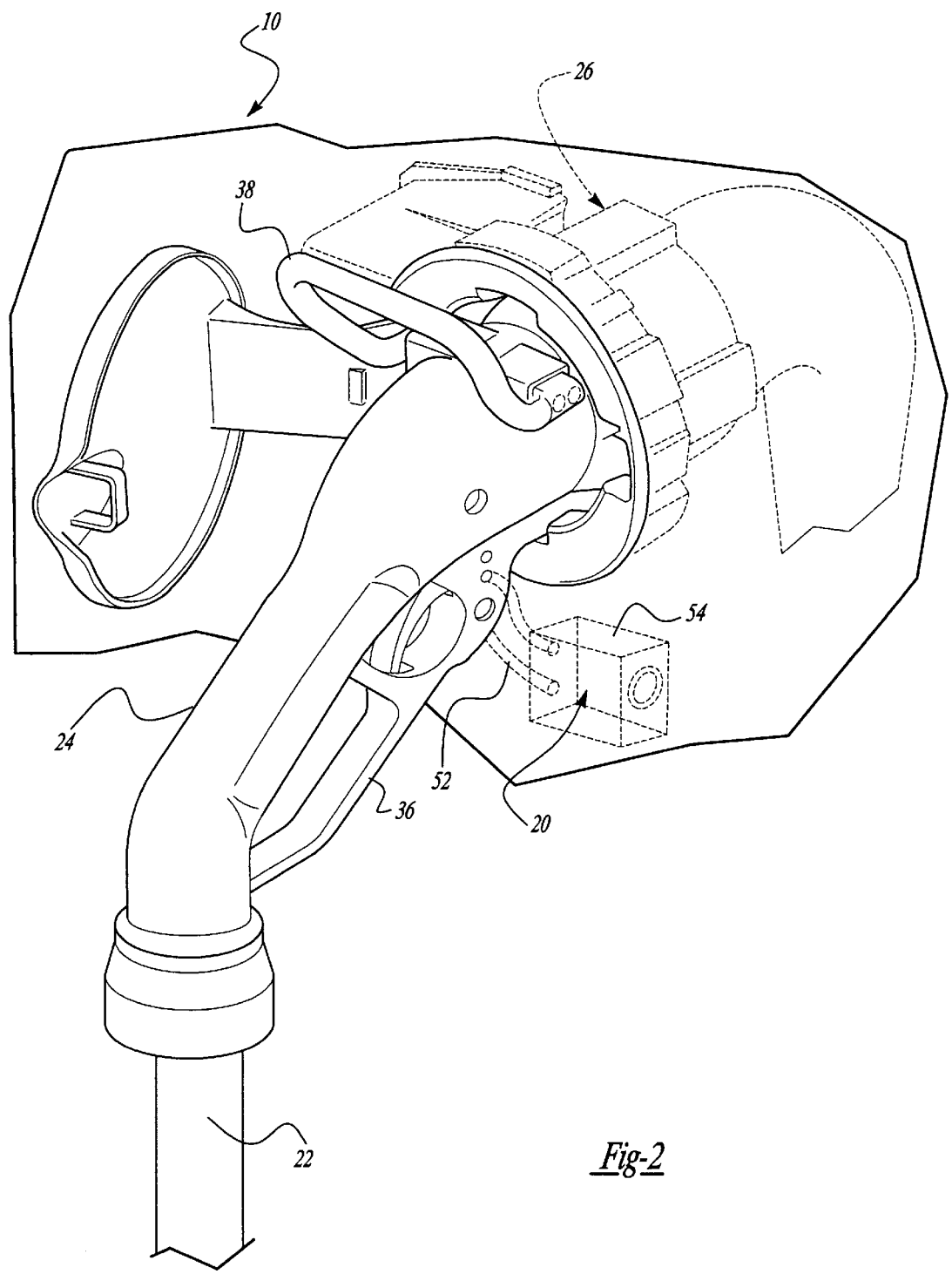
FIG. 2 is an exploded perspective view of the connector of FIG. 1.
Figure 3:
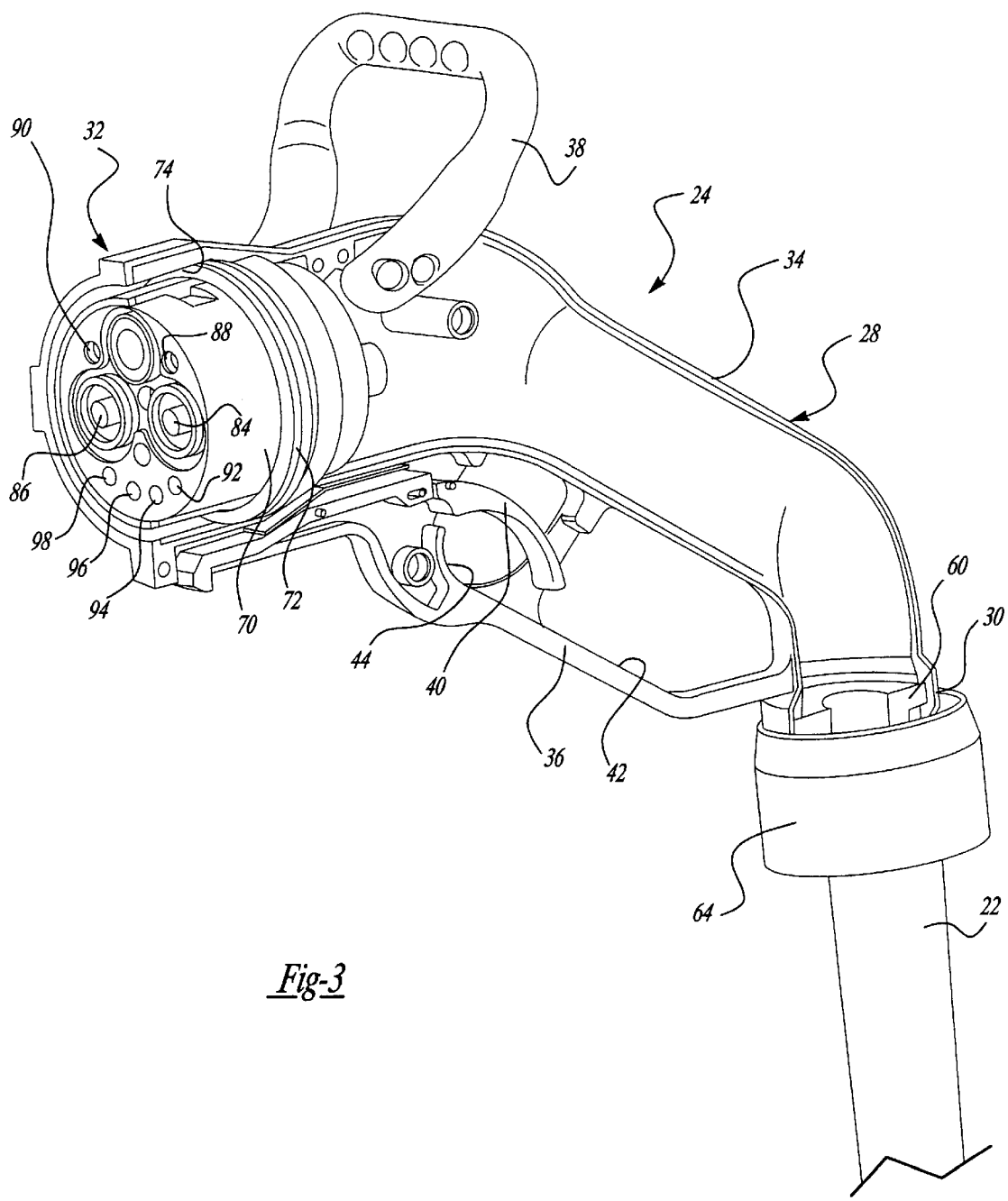
FIG. 3 is a partial cross-section view of the male connector of FIG. 2.

Turning to the figures, a vehicle 10 has a connector assembly 20 to transmit power from a power source 14 to the vehicle 10. The vehicle 10 is an electric vehicle including chargeable batteries 16 which are housed within the vehicle. The power source 14 includes a control box 18 which distributes power via the cord 22 through connector assembly 20 to the vehicle 10. The control box 18 may be set up to deliver DC current at about 400 amps at a desired voltage or AC current at about 40 amps at a desired voltage. Ordinarily, if a direct current is flowing, the voltage is high and around 400 volts. If the AC current is flowing, the current is lower, somewhere around 220 volts. Accordingly, the connector assembly 20 is capable of hand ling both AC and DC currents that are provided from different power sources.

The connector assembly 20 includes a male connector 24 coupled with the wire 22 and a female connector 26 coupled with the vehicle 10. The male connector 24 includes a housing 28 having one end 30 connected with the wire 22 and the other end 32 to be coupled with the female housing 26. The housing 28 has an elongated U-shape with the ends 30 and 32 defining the legs of the U and a web 34 between the two legs. The housing includes two parts which are coupled together with one another. The housing has two handles 36 and 38 to enable manipulation of the male connector 24. The handle 36 acts as a trigger guard for trigger 40 and includes openings 42 and 44. Th e openings enable the user to position a hand within the trigger guard handle 36. The handle 38 has an overall U-shape and is secured to the housing 28 near the front end 32. The U-shaped handle 38 enables the user to use two hands on the connector for easy manipulation to connect with the male 24 and female housing 26.

The housing 28 houses the trigger 40 which is coupled with a catch 46. The catch 46 releasably secures the male and female connectors together. The catch 46 has a downturned end 48 which secures with the female connector 26. The trigger 40 as well as the catch 46 are connected to one another about a pivot 49 in the housing. The trigger 40 is pivoted in the opening 44 which, in turn, moves the latch 46 in and out of connection with the female connector 26 to release the male connector from the female connector.

The trigger guard handle 36 includes a bore 50 which passes through the trigger guard handle 36 adjacent to the trigger and latch connection. The bore 50 enables passage of a U member 52 of a padlock 54 so that the trigger 40 can be locked in position during charging of the vehicle batteries. Once the member 52 is passed through the bore, the U-member 52 in the bore prohibits the trigger 40 from being moved. Thus, this prohibits the latch 46 from moving and releasing the male connector 24 from the female connector 26. Accordingly, the connectors 24 and 26 can be effectively locked with one another, prohibiting unauthorized separation of the connector members 24, 26 during charging.

The housing 28 is hollow to enable wires to pass from the rear end 30 to the front end 32. The rear end 30 includes an external thread 56 and an internal circumferential groove 58.

The circumferential recess 58 receives a flanged end 60 of a strain relief 62 to secure the wire 22 with the housing 28. A nut 64 surrounds the strain relief 62 and screws onto the external thread 56. The housing may receive several different strain reliefs and nuts so that different sized wires may be connected with the housing 28.

At the front end of the housing 32, a contact retaining member 70 is positioned in the housing 32. The contact retaining member 70 is of an insulated material to prohibit arcing between the positive and negative electrical contacts. The contact retaining member 70 includes circumferential projection 72 which is received in recess 74 from the housing 28 to retain the contact retaining member 70 in a desired orientation in the housing 28. The contact retaining member 70 includes a plurality of apertures to enable passage of electrical contacts. Bore 76 includes the ground contact 78. Bores 80 and 82 receive DC electrical contacts 84 and 86. Bores 88 and 90 receive AC electrical contacts (not shown). Bores 92, 94, 96 and 98 receive various types of control lines as will be explained herein.

The male connector 24 may include DC contacts 84 and 86. However, if the power supply is AC current, then the DC contacts would be removed and AC contacts would be positioned in bores 88 and 90. Thus, the male connector member 24 is adapted to receive both the AC or DC current contacts. Also, the male connector 24 is adapted to receive both AC or DC current from the power source, depending upon what type of power source is used. However, only one power source, either DC or AC, will be utilized in the male member at one time.

Turning to FIGS. 6 through 14, a better understanding of the female connector may be had. The female connector includes a first cup shaped member 110, a second contact holding member 112, and a third ring member 114 which includes a cover 116.

The cup shaped member 110 has a circumferential wall 120 which terminates at a base 122 and has an opened end with a flange 124. The base includes a collar 126 which extends on its opposite side away from the wall 120. The flange 124 includes openings 128 with latching fingers 130 positioned in the opening to secure the cup member 110 with the ring 114. The base 122 includes a plurality of bores to receive the electrical contacts that are secured on the contact holding member 112. The bore 132 receives a common ground 134 which is connected with the ground 78 of the male connector 24. Bores 136 and 138 receive electrical contacts 140 and 142. Contacts 140 and 142 are positive and negative DC contacts and are adapted to couple with the DC electrical contacts 84 and 86 of the male member. The bores 144 and 146 receive contacts 148 and 150. Electrical contacts 148 and 150 are adapted to couple with the AC contacts (not shown) in the male connector 24.

Bores 152, 154, 156 and 158 receive electrical contacts 160, 162, 164 and 166 which provide various control circuits through the connector assembly.

The electrical contact holding member 112 includes a plurality of cut-outs to hold the electrical contacts. The holding member 112 is manufactured from an insulated material and fits into the collar 126 on the cup member 110. Also, fasteners secure the holding member 112 with the cup shaped member 110. Cut-out 170 holds the ground 134. Cut-outs 172 and 174 hold the DC electrical contacts 140 and 142. Cut-outs 176 and 178 hold the AC electrical contacts 148 and 150. Cut-outs 180, 182, 184 and 186 hold the contacts 160, 162, 164 and 166. All of the cut-outs include a bottom arcuate portion 188 which is slightly smaller than the outward parallel wall portions 190, 192 so that barbs 194 are formed. The electrical contacts are pressed and frictionally held by barbs 194 within the holder cut outs as seen in FIG. 14.

Figure 4:
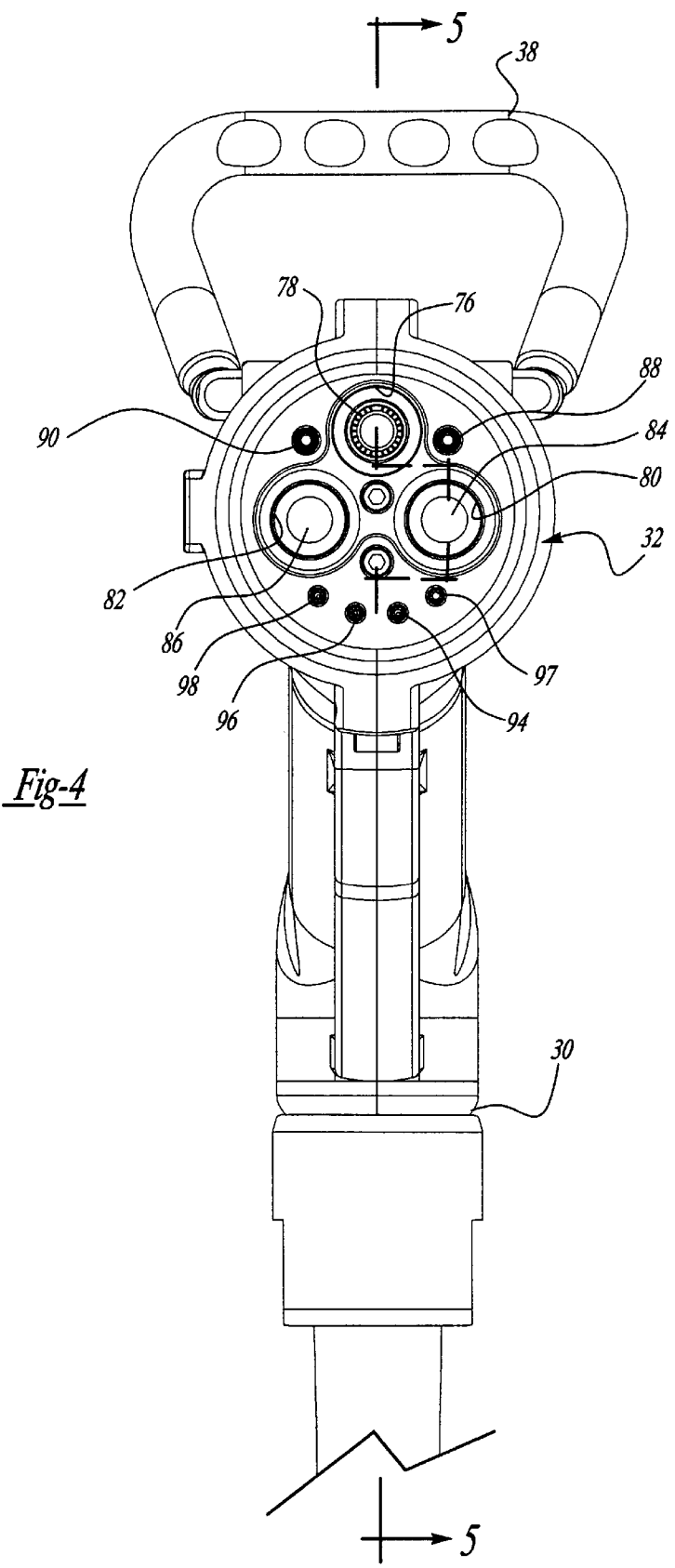
FIG. 4 is an elevation view of the male connector of FIG. 2.
Figure 5:
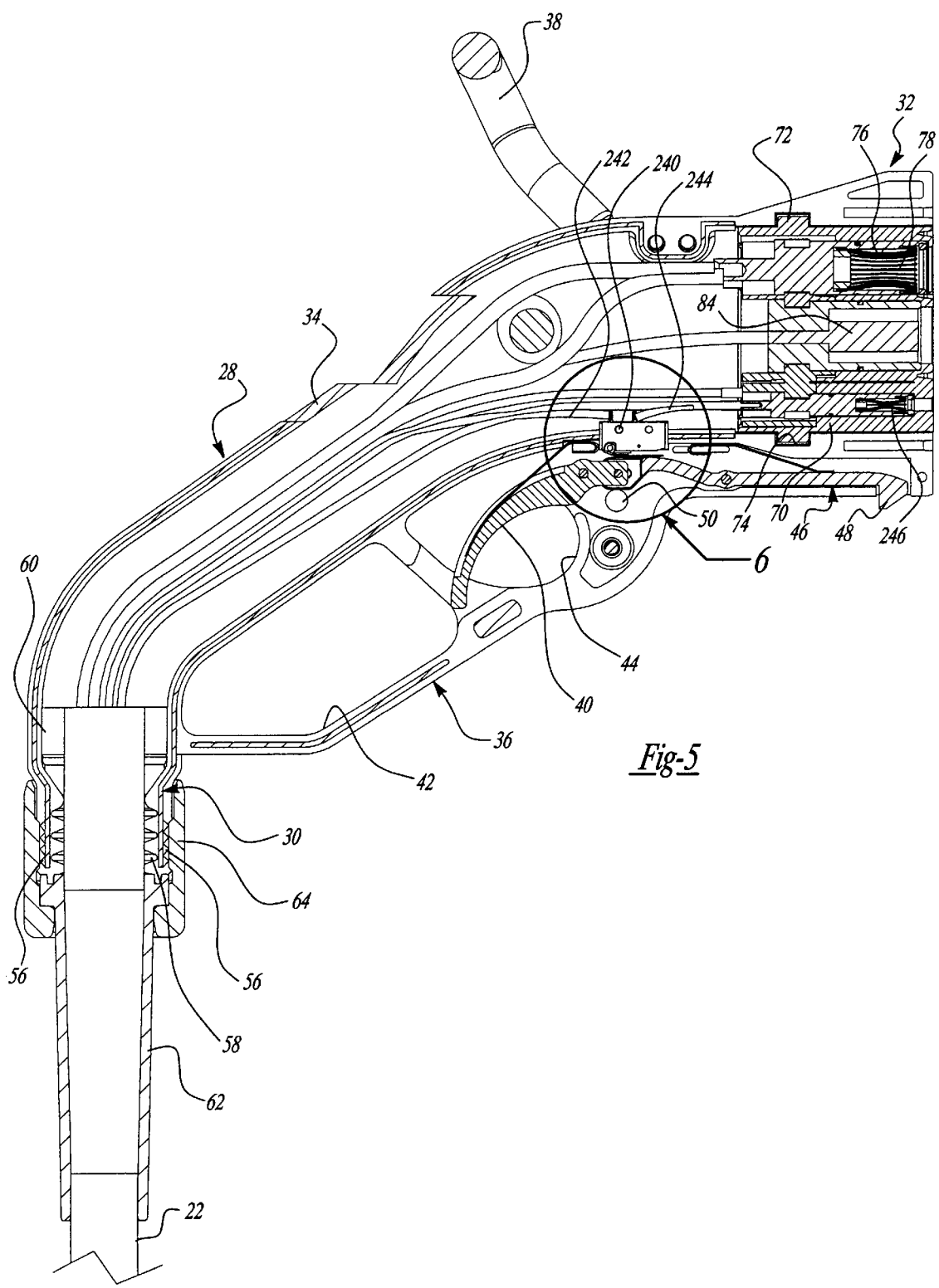
FIG. 5 is a cross-section view of FIG. 4 along line 5—5 thereof.
Figure 6:
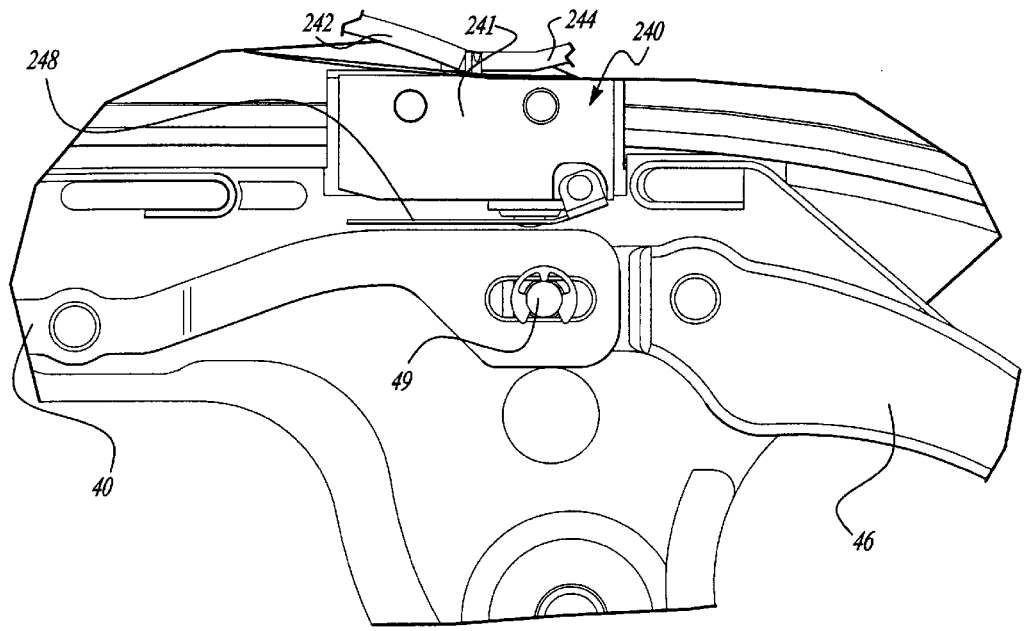
FIG. 6 is an enlarged view of FIG. 5 within circle 6.
Figure 7:
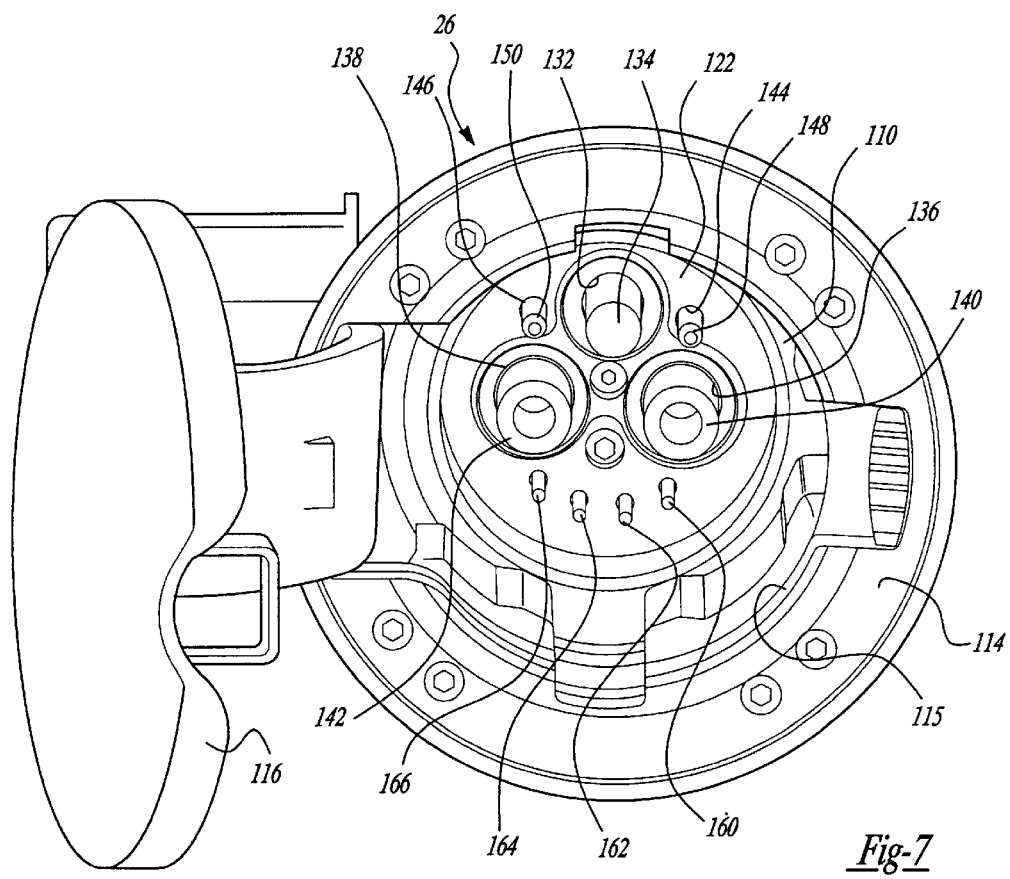
FIG. 7 is a perspective view of the female connector of FIG. 2.
Figure 8:
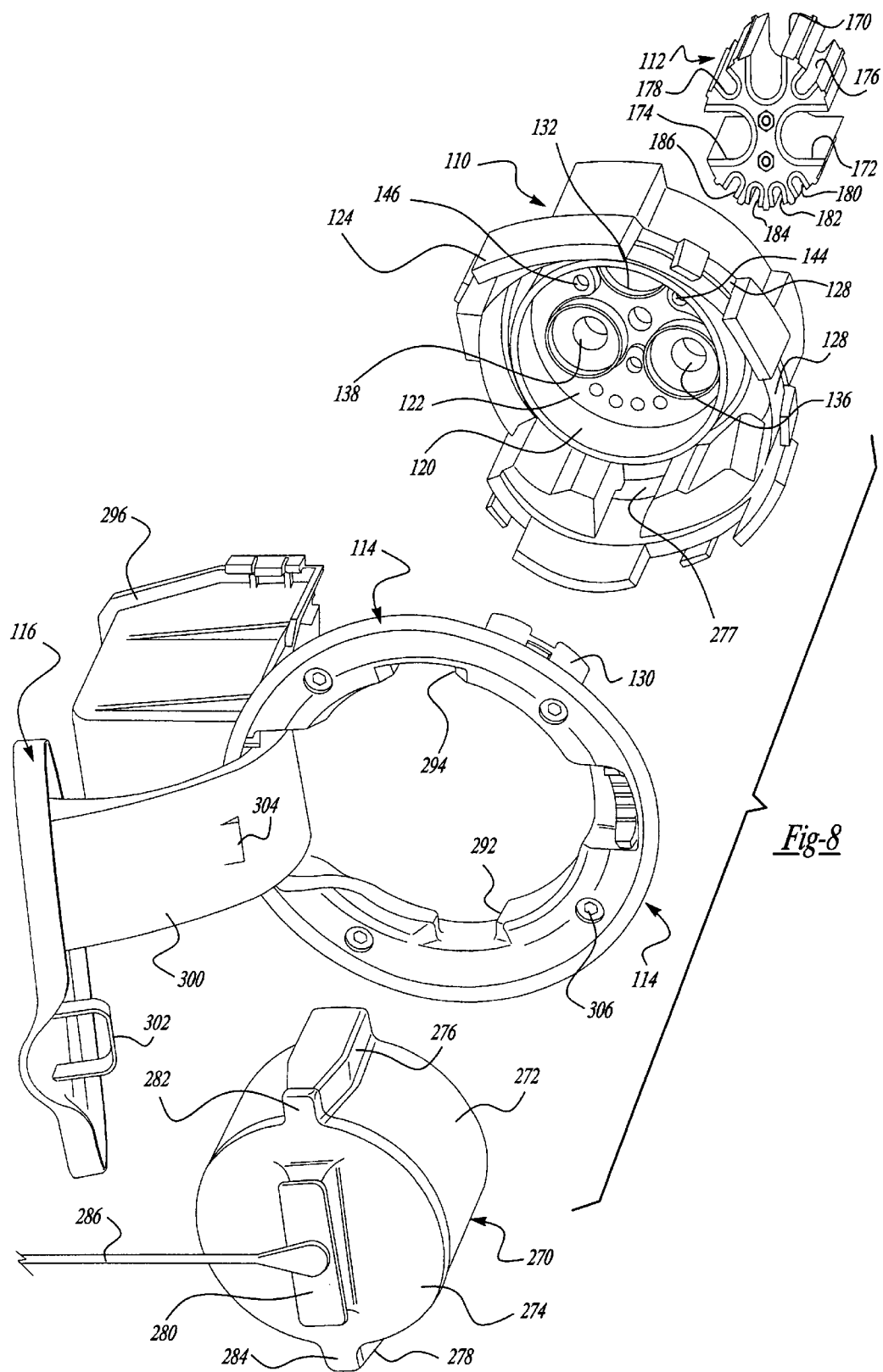
FIG. 8 is an exploded perspective view of FIG. 7.
Figure 9:
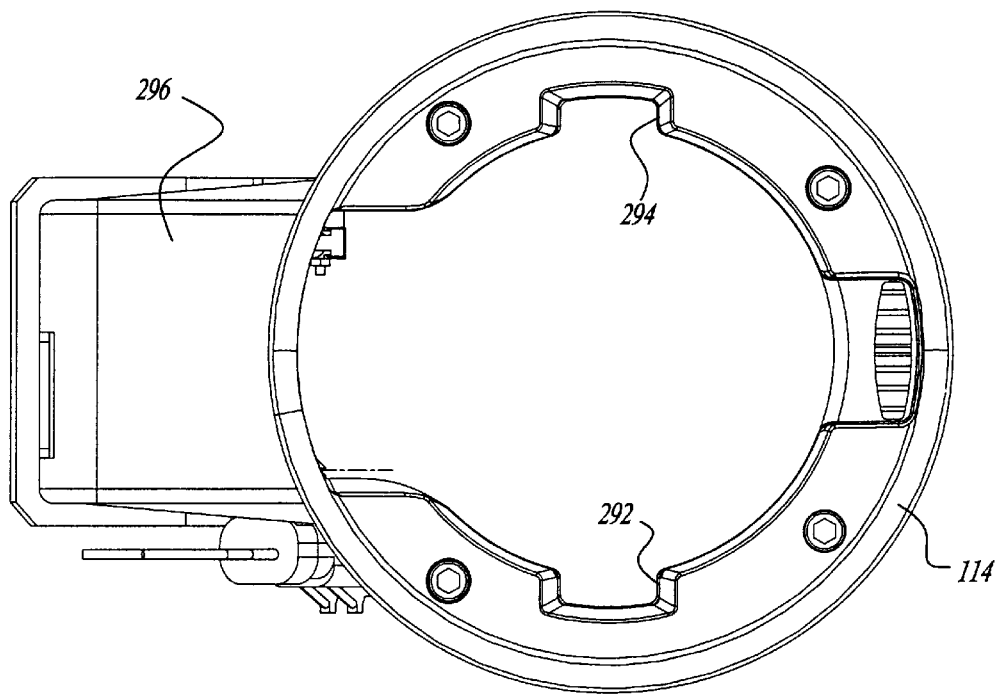
FIG. 9 is an elevation view of the bezel front.
Figure 10:
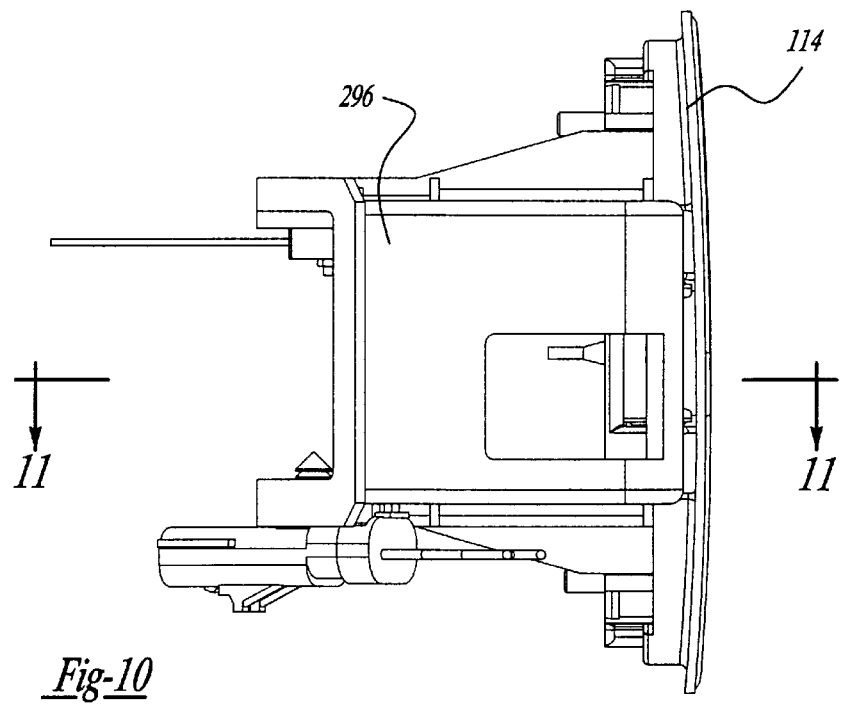
FIG. 10 is an elevation view of the bezel side of FIG. 9.
Figure 11:
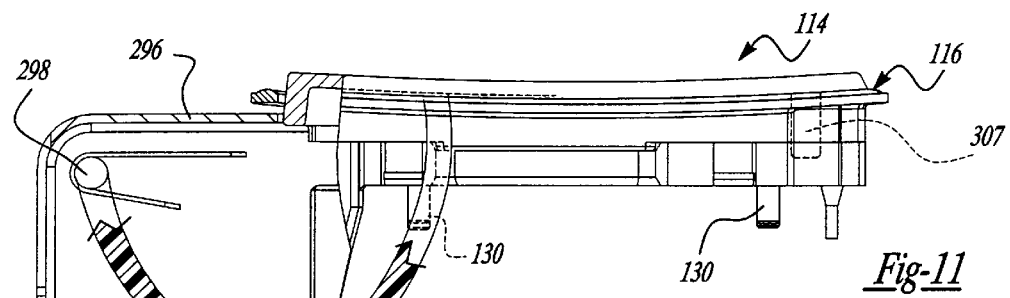
FIG. 11 is a cross-section view of FIG. 10 through line 11—11 thereof.
Figure 12:
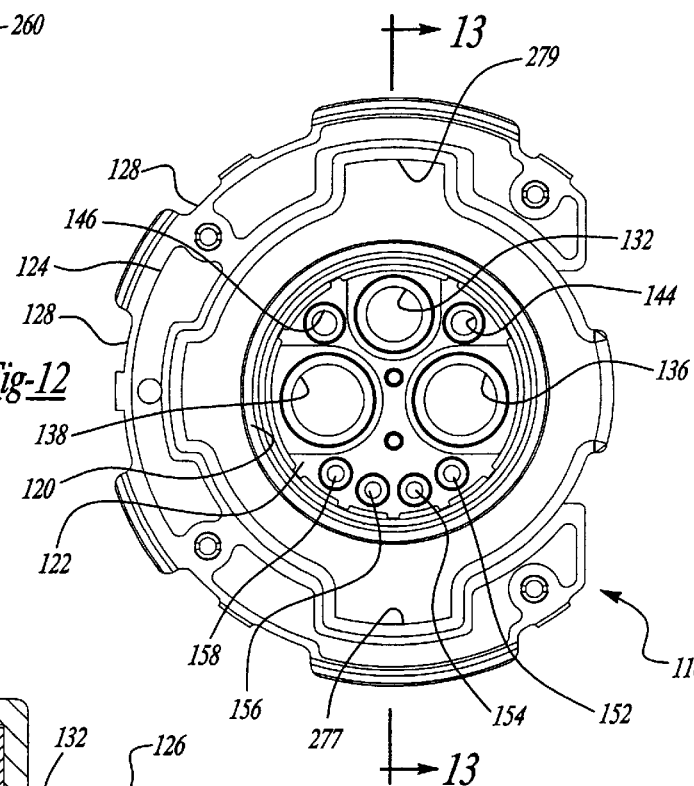
FIG. 12 is an elevation view of the cup of the female connector of FIG. 8.
Figure 13:
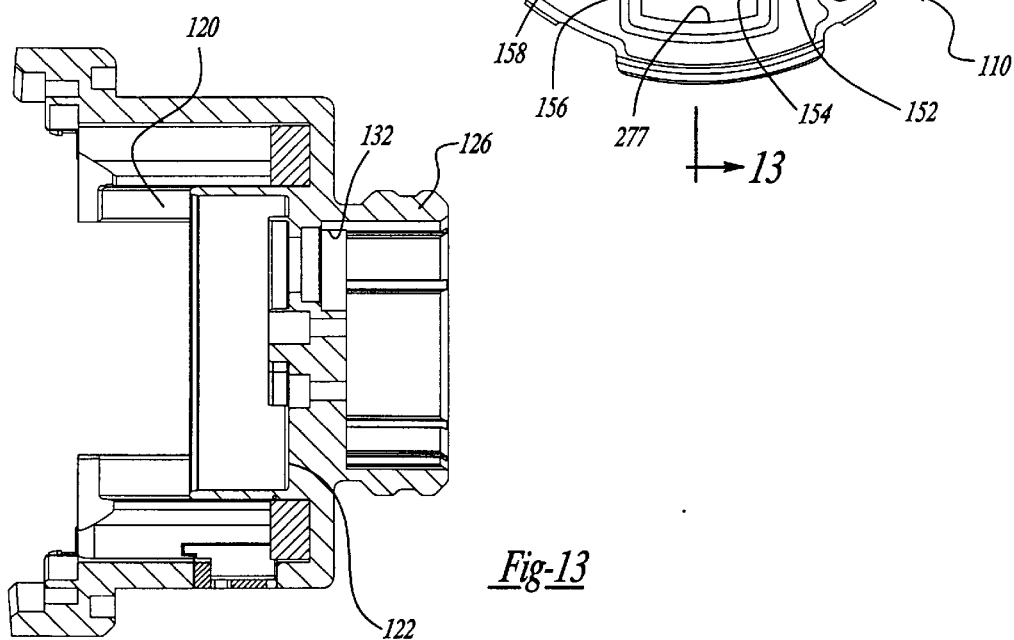
FIG. 13 is a cross-section view of FIG. 12 through line 13—13 thereof.

Returning to FIGS. 4 and 5, a mechanism for terminating the power from the power source is shown and illustrated with the reference numeral 240. The mechanism 240 includes a switch 241 having lead wires 242 and 244. Wire 242 goes back to the control box and lead 244 goes to an electrical contact 246 in one of the bores 92 through 98. The switch 241 includes an arm 248 which is coupled with the trigger 40 and latch 46 such that upon activation of the trigger 40, the switch 241 deactivates power from the power source to the vehicle. Thus, upon removal of the male connector 24 from the female connector 26, the trigger 40 is lifted upward which, in turn, activates switch 240, which sends a signal to the power source, terminating power to the either AC or DC electrical contacts. This prohibits arcing between the contacts upon removal from the female connector 26. The power source would then be terminated until it is turned on again to recharge the vehicle.

Returning to FIG. 11, a mechanism 260 for disabling the vehicle while it is charging is shown. The mechanism 260 includes a switch 262 which is connected to the vehicle control module such that, upon opening of the cover 116, the switch is activated to de-energize the vehicle. The de-energizing of the vehicle cuts off the power such that once the connectors are coupled together, the vehicle cannot be moved. Thus, unauthorized movement of the vehicle cannot be accomplished until charging is complete.

A cap 270 is provided to cover the contacts on the vehicle. The cap 270 includes a cover portion 272 and a lock portion 274. The cover portion 272 is cup shaped and has projecting members 276 and 278 which mate with recesses 277 and 279 in the female cup shaped member 110. The lock portion 274 includes a handle 280 and a pair of tabs 282 and 284. Also, a strap 286 is connected with the handle for securing the cap 270 with the housing so that when the cap is removed it remains attached to the housing.

The tabs 282 and 284 align with the projecting members 276 and 278. A groove 115 is formed between the ring 114 and cup 110. When the cap 270 is positioned in the female housing, the handle 280 is turned wherein the tabs 282 and 284 move within the groove 115 locking the cap 270 in the female connector. A spring 288 is secured to the cover 274 and cup 272 to bias the cover 274 between positions. See FIGS. 8 and 16. Also, detents are located in the recess for trapping the tabs 282 and 284 in the groove.

The ring 114 includes recesses 292 and 294 which enable passage of the cap projections 276 and 278. Also, a housing 296 is secured with the ring 114. The housing 296 includes a pivot 298 which couples the cover arm 300 with the housing 296. The cover arm 300 is coupled with the cover 116. The cover 116 also includes a latch 302 which may be secured with the ring 114 or have a member projecting through the ring to secure the cover in a closed and locked position. The housing 296 includes mechanism 260 attached thereto. Accordingly, when the cover is in a closed position, an arm tab 304 contacts the switch lever 264 which closes the circuit activating the vehicle enabling it to be moved away. Accordingly, the cover must be shut for the vehicle to run.

The ring 114 is positioned such that the housing 296 is under the vehicle sheet metal and the ring 114 is on the outside of the sheet metal. Fasteners are passed through the holes 306 through the vehicle sheet metal to connect the ring 114 with the vehicle as well as the cup member 110.

While the above detailed description describes the preferred embodiment of the present invention, the invention is susceptible to modification, variation and alteration without deviating from the scope and fair meaning of the subjoined claims.

What is claimed is:

1. An electrical connector assembly, comprising:
a male connector having a housing, electrical contacts in said housing for conducting AC or DC current and said housing includes receptacles for receiving AC electrical contacts and separate receptacles for receiving DC electrical contacts;
a female connector having a housing for coupling with said male connector housing, electrical contacts in said female housing for coupling with said electrical contacts in said male housing, said housing of said female connector including receptacles for receiving AC electrical contacts and separate receptacles for receiving DC electrical contacts;
said connectors for coupling between a power source and a rechargeable power user; and
a mechanism for terminating power of the rechargeable power user prohibiting use of the rechargeable power user during charging.

2. The electrical connector assembly according to claim 1, wherein said rechargeable power user being an electric vehicle.

3. The electrical connector assembly according to claim 2, wherein said mechanism including a switch for cutting off power in said vehicle so that the vehicle is disabled during charging.

4. The electrical connector assembly according to claim 1, wherein the mechanism is coupled with the connector on the rechargeable power user.

5. The electrical connector assembly according to claim 1, wherein said female housing having a cover for covering said electrical contacts in a disconnected position.

6. The electrical connector assembly according to claim 5, wherein said cover activating said mechanism upon opening of said cover to enable connection with said male connector.

7. The electrical connector of claim 5 wherein said mechanism is coupled to said cover for actuation to terminate power of the rechargeable user upon opening of said cover.

8. The electrical connector of claim 7 wherein said mechanism comprises a switch that is actuated by said cover upon the opening of said cover to terminate power of the rechargeable user.

9. An electrical connector assembly, comprising:
a male connector having a housing, electrical contacts in said housing for conducting AC or DC current and said housing includes receptacles for receiving AC and DC electrical contacts;
a female connector having a housing for coupling with said male connector housing, electrical contacts in said female housing for coupling with said electrical contacts in said male housing, said connectors for coupling between a power source and a rechargeable power user;
said female housing having a cover for covering said electrical contacts when said male connector is disconnected from said female connector; and
a mechanism coupled to said cover and being actuated by said cover upon the opening of said cover to terminate power of the rechargeable power user prohibiting use of the rechargeable power user during charging, said mechanism being deactuated by said cover upon the closing of said cover to reestablish power of the rechargeable user.

10. The electrical connector assembly according to claim 9 wherein said mechanism comprises a switch that is switched between first and second states by said cover opening and closing.

* * * * *